United States Patent [19]

La Plante et al.

[11] Patent Number: 4,929,073
[45] Date of Patent: May 29, 1990

[54] KINEMATIC MOUNT

[75] Inventors: John A. La Plante, Winchester, Mass.; Robert D. Schaefer, Huntington Beach, Calif.

[73] Assignee: Hughes Aircraft Company, Los Angeles, Calif.

[21] Appl. No.: 183,353

[22] Filed: Apr. 12, 1988

Related U.S. Application Data

[63] Continuation of Ser. No. 664,442, Oct. 24, 1984, abandoned.

[51] Int. Cl.$^5$ .............................................. G02B 5/08
[52] U.S. Cl. ................................. 350/609; 350/252; 403/59
[58] Field of Search ............... 350/609, 636, 247, 252, 350/253; 403/13, 14, 59, 61, 82, 369, 375; 248/487

[56] References Cited

U.S. PATENT DOCUMENTS

| | | | |
|---|---|---|---|
| 2,937,571 | 5/1960 | Thompson | 350/252 |
| 3,202,107 | 8/1965 | Phinney | 403/59 |
| 3,249,008 | 5/1966 | Angenieux | 350/247 |
| 3,588,232 | 6/1971 | Mostel | 248/487 |
| 3,713,725 | 1/1973 | Uesugi | 350/247 |
| 3,842,769 | 10/1974 | Maynard | 403/61 |
| 4,194,406 | 3/1980 | Böhlmark | 403/82 |
| 4,268,123 | 5/1981 | Mesco | 350/609 |

FOREIGN PATENT DOCUMENTS 476325 8/1951 Canada .............................. 403/59

OTHER PUBLICATIONS

J. A. LaPlante, "Mirror Mounting System Design for High-Energy Optics", Jun. 1982, pp. 1–81.

Primary Examiner—Bruce Y. Arnold
Assistant Examiner—Jay Ryan
Attorney, Agent, or Firm—William J. Streeter; Wanda K. Denson-Low

[57] ABSTRACT

An optical element (10) is mounted and aligned with minimum strain and distortion within a support (12) to which at least three mounts (14) are attached and spaced 120° about the periphery of the optical element. Each mount comprises a spherical disc (16) spherically contacting a spherical surface (30) on a seat (20) which is linearly moveable within a housing (18). Each disc abuts and supports the optical element. Any loading exerted on the support causes the discs to rotate with respect to the seats and the seats to reciprocate with respect to the annular disc-retaining housings to prevent such loadings from being transmitted to the optical element, thereby enabling the optical element to maintain a chosen, strain-free orientation with pressure on the spherical disc being evenly distributed.

13 Claims, 4 Drawing Sheets

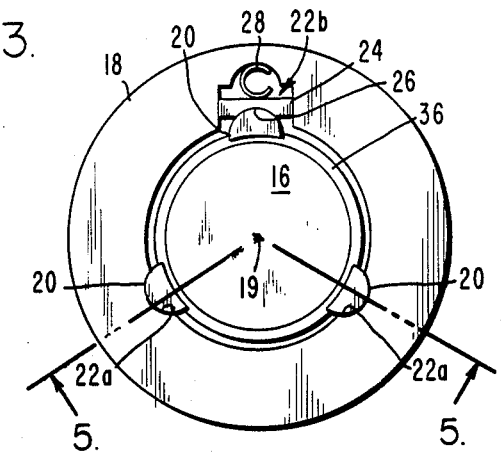
Fig. 3.
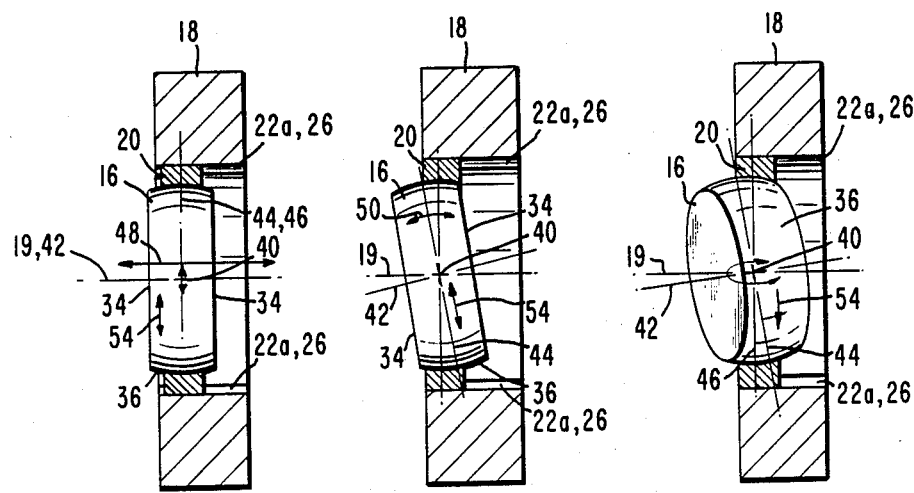
Fig. 4.
Fig. 5a. Fig. 5b. Fig. 5c.

Fig. 8a.
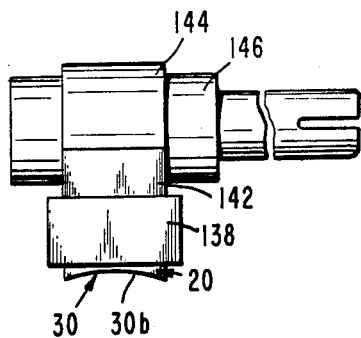
Fig. 8b.
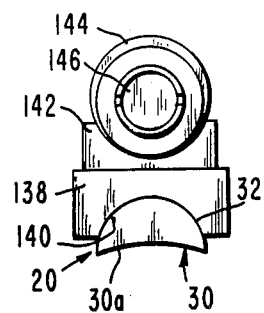
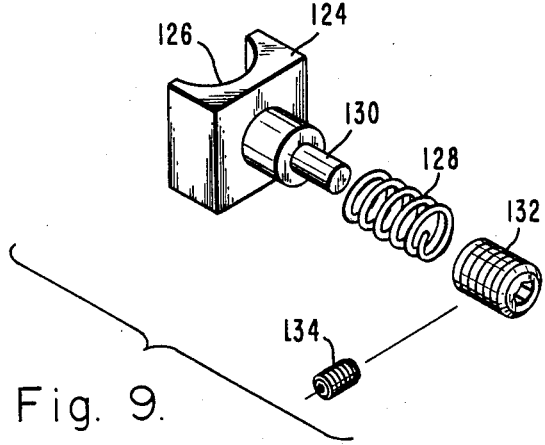
Fig. 9.

KINEMATIC MOUNT

The Government has rights in this invention pursuant to Contract No. F29601-80-C-0056 awarded by the Department of the Air Force.

This application is a continuation of application Ser. No. 664,442, filed Oct. 24, 1984.

BACKGROUND OF THE INVENTION

1. Field of the Invention

The present invention relates generally to kinematic arrangements for mounting strain sensitive devices such as optical elements and, more particularly, to an improved kinematic mounting arrangement with strain isolation, mechanical stiffness and distributed load capacity.

2. Description of Related Art

As described in U.S. Pat. No. 4,268,123 patented 19 May 1981, entitled "Kinematic Mount" and issued to the same assignee as herein, any movement of optical elements, when exposed to thermal expansion of their support, must be prevented to avoid optical distortion. For example, a lens, mirror, prism, or IR sensor mounted in a close fitting metal cell will maintain its relative alignment with respect to the cell in the absence of ambient temperature variations. However, problems may arise when such variations occur. Upon a decrease in temperature, the metal cell, where the coefficient of thermal expansion is normally higher than that of glass, will contract more rapidly than the glass, and press thereon to fracture the glass or at least stress the glass to the point of distorting the optical image which is transmitted through the glass or reflected therefrom. Conversely, as the temperature increases, the cell will expand more rapidly than the glass, leaving the lens somewhat unrestrained and free to move laterally within the cell, causing the optical element to become out-of-focus.

Various attempts have been proposed and used to avoid damage to an optical element, while still restraining it sufficiently to prevent excessive lateral displacement within its cell. For example, the element is encircled with a thin endless metallic strip which is pressed into place around the element and attached to the cell. However, where wide temperature variations are encountered, this method is objectionable because an excessive radial load must be applied by the strip to the element to hold the strip in place. Also, the metallic ring and optical element must have very accurate dimensions to fit the ring properly into the optical element and, in practice, it is usually necessary to grind the element to the encircling ring, a costly and time consuming practice.

In another commonly used mounting method, spring loaded members are equally spaced around the periphery of the element and positioned between it and its supporting cell. One disadvantage of this method is the difficulty of positively aligning the element in the cell. Another disadvantage is that the spring constants of the loading springs are or become unequal, especially after being subjected to a series of wide temperature variations. The result is a relative misalignment of the elements after extended use of the instrument in which the optical element is mounted.

A further method is to interpose some resilient material between a lens and its retaining cell to absorb lateral shock, and to compensate for the effects of temperature variation and attendant differential thermal expansion of the lens and the cell. The resilient material usually is a gasket or a series of equally spaced shims for effectively centering the element. One major objection to this method is that the interposed material deteriorates and loses its resiliency after the passage of time or after the optical system has been subjected to a series of wide temperature variations. Such deterioration of the interposed material may also result in a loss of relative alignment of the optical axis of the various optical elements in the system.

To overcome some of the disadvantages of the last-described method, tangent straps are placed around the optical element. These straps provide relatively low elastic joints which are useful for minimizing thermal expansion strains while allowing the optical element to remain fixed. The major objection to this method is that the thermal expansion strains are not entirely relieved due to the low elasticity of the tangent straps, thus causing the transmission through the optical element to become distorted. Additionally, the straps do not compensate for loading that cause the optical element to move out-of-plane.

The kinematic mount described in the above-referenced U.S. Pat. No. 4,268,123 overcomes the above problems by providing a novel ball-in-cylinder kinematic mounting arrangement for such an optical element by maintaining it in a relatively strain-free condition under a wide variety of temperature and mechanically induced motions. Specifically, the optical element is mounted and aligned relative to its housing by three mounts placed 120° apart. Each mount includes a disc member having a spherically contoured peripheral surface and flat side surfaces, one of which is affixed to the edge of the optical element. The spherical surface is mounted in a cylindrical retaining sleeve and has an essentially one-dimensional contact therewith along a circular path. The resultant forces, exerted by the housing and the optical element on the three disc members, stabilize the disc members, and thereby create equilibrium in the mounting and aligning device.

Use of the above-described ball-in-cylinder kinematic mount has been found to be very effective for small, light optical elements and other components in which the circular contact between the ball and the cylinder supports the loads exerted therein. However, if the exerted load is too great at a point on the circle, the point contact can produce high localized stresses and permanent deformation, resulting from Brinelling, to degrade seriously the performance of the kinematic mount.

SUMMARY OF THE INVENTION

The present invention avoids and overcomes the above-described problem and, therefore, constitutes an improvement thereof. Specifically, the ball-in-cylinder arrangement of U.S. Pat. No. 4,268,123 is replaced by one in which the ball at its spherical periphery is supported on a similarly dimensioned spherical surface. Thus, the unidimensional circular contact is replaced by a three-dimensional large surface contact which enables the loads to be greatly distributed. In addition, the spherical surface comprises a surface on one or more seats positioned in a circle about the disc. The seats contact a support so that they are constrained to move linearly with respect to the support in a path which is generally parallel to that of the optical element's axis. If desired, the seat contact with the support may have a cylindrical configuration to provide a slight rotational rocking enhancement. Accordingly, where the ball-in-cylinder arrangement of U.S. Pat. No. 4,268,123 provides a circular contact with both rotational movement in three axes and linear movement between only two surfaces, the present invention segregates these movements between a pair of two surfaces, one pair for triaxial rotational movement and the other pair for linear movement and, if desired, rocking movement, with both rotational and linear movements acting between surfaces rather than about and on a unidimensional circular line.

Because the improved mount arrangement provides segregated rotational and linear freedom of motion, when temperature variations occur, the disc member of a mount may rotate and pivot relative to the surrounding retaining seat in which it is in contact, and the seat may linearly move in its support to absorb those motions which would otherwise stress and misalign the optical element and to maintain the orientation of the optical element substantially fixed.

Several advantages accrue from the present invention in addition to those of U.S. Pat. No. 4,268,123. An improved novel mount is provided for optical elements and the like. The mount is essentially free from strain, yet rigid to maintain optical elements in optical alignment over wide temperature ranges. Friction is reduced. The adjustment, centering and retention of such optical elements are compensated for any dimensional inaccuracies in their mounting. Because the bottom of the seats have a cylindrical contour which is lapped or similarly fitted into a matching groove or channel in the cylinder housing, the disc is still allowed to move in the housing with temperature changes. The seats rotate to align themselves with the disc. In this manner, the localized stresses are removed and two full surface contacts result. These full surface contacts also allow better lubrication than a point contact by reducing the contact pressure which tends to break through the lubricant film. The coefficient of friction can, therefore, be reduced. These characteristics allow the use of larger weights of the optical element without resulting in the increased forces which are exerted on the element in the ball-in-cylinder arrangement and their attendant frictional damage to the surfaces.

Other aims and advantages, as well as a more complete understanding of the present invention, will become more apparent from the following detailed description of exemplary embodiments in connection with the accompanying drawings thereof.

BRIEF DESCRIPTION OF THE DRAWINGS

FIG. 3 is a front elevational view of one of the mounting and aligning devices shown in FIG. 1;

FIG. 4 is a perspective view of one of the seats;

FIGS. 5a-5c are cross-sectional views of one of the mounts illustrating its freedom of motion;

FIGS. 8a and 8b are side and end views of a portion of the mechanism for effecting the adjustment of the modification shown in FIGS. 6 and 7; and FIG. 9 is an exploded view in perspective of a second portion of the mechanism illustrated in FIGS. 6 and 7.

DETAILED DESCRIPTION OF THE PREFERRED EMBODIMENT

The present invention and the background thereof is further described in a these entitled "Mirror Mounting System Design for High-Energy Optics" by one of the inventors hereof, John A. LaPlante, submitted to the Department of Mechanical Engineering, Massachusetts Institute of Technology, and published on 24 October 1983, in The Libraries thereof. The contents of the thesis are incorporated herein as if set forth in haec verba.

Figure 1:
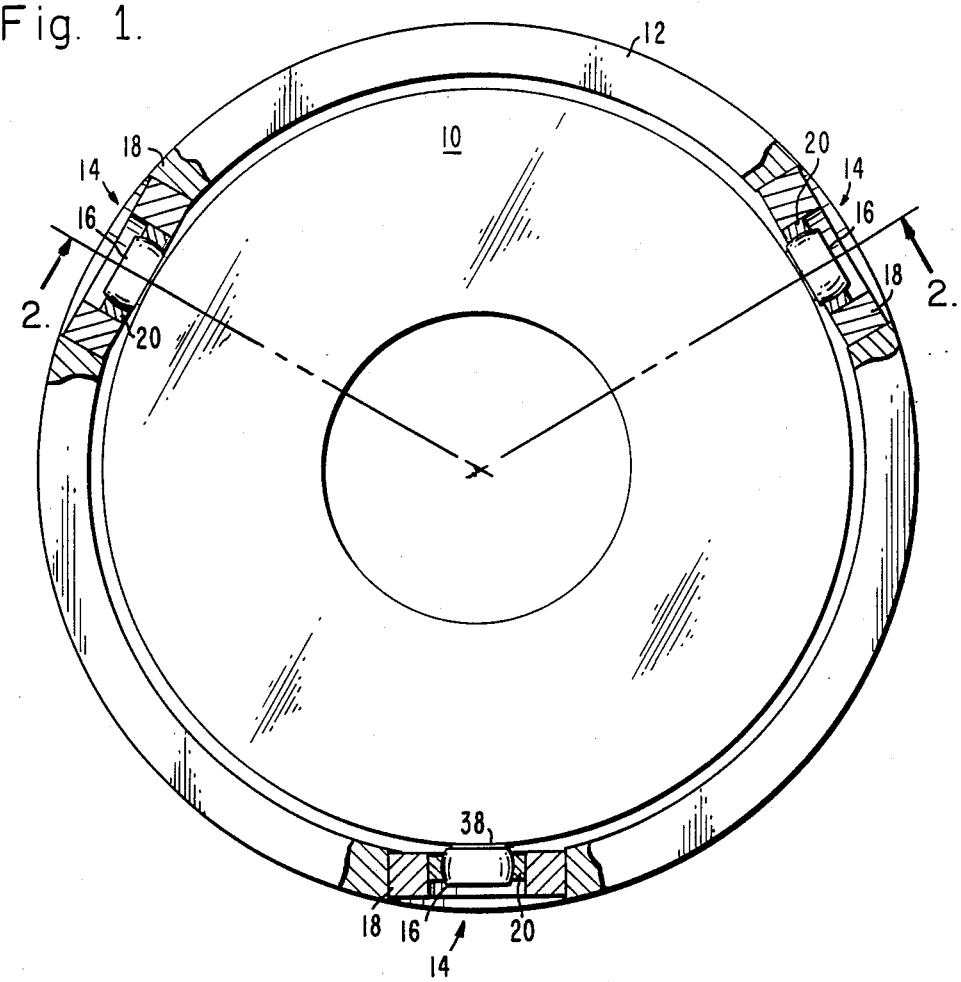
FIG. 1 is a front elevational view of an optical element mounted in a support utilizing three mounting and aligning devices of the present invention.
Figure 2:
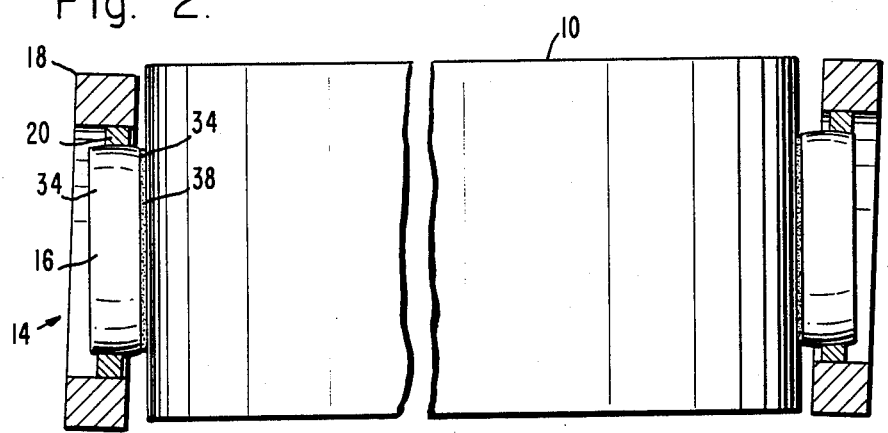
FIG. 2 is a side view of two of the mounts on the optical element taken along lines 2—2 of FIG. 1, illustrating the alignment principle of the present invention.

Referring to FIGS. 1 and 2, an optical element 10 is mounted on a support 12 by three mounting and aligning devices or mounts 14. Mounts 14 are positioned around the periphery of element 10 and define a plane through the element. While three mounts are shown, it is to be understood that any number of mounts can be used so long as all define a single plane passing through the optical element. In a typical system, optical element 10 comprises a mirror which is housed in support 12.

As also shown in FIG. 3, each mount includes a disc 16, an annular housing 18 having an axis 19, and three seats or pads 20 placed therebetween. The housing is secured at its outer periphery to support 12 by any suitable means. Within its inner periphery, housing 18 has three channels 22a and 22b which extend parallel to axis 19 of the housing. Two of the three channels designated by indicium 22a are similar and have a curved cylindrical configuration of circular shape. The third channel designed by indicium 22b is configured differently to receive a pad block 24 having a right cylindrical channel 26 therein configured similarly as the cylindrical surfaces of channels 22a. A spring 28, for example of C-shape, is placed between pad block 24 and the bottom of channel 22b so as to urge the pad block in a direction toward the axis of housing 18 for the purpose, such as stated in above-referenced U.S. Pat. No. 4,268,123, of overcoming misalignment, compensating for machining tolerances, and differential thermal expansion between disc 16 and housing 18.

Placed within each of the right cylindrical channels 22a and 26 are seats 20. As best illustrated in FIG. 4, each seat has a general D-shape and comprises a portion of a solid right cylinder having two curved surfaces 30 and 32. First surface 30 is of spherical concave shape to interfit with a spherical periphery 36 of disc 16 and, therefore, exhibits a pair of right angled curved surfaces 30a and 30b. Its second surface 32 has a curvature which interfits with the curvatures of channels 22a and 26. This interfit permits seat 20 two degrees of movement in their channels. A first movement is slightly rotational or rocking, while the second movement is linear to housing axis 19. If desired, second surface 32 and channels 22a and 26 may be interfittingly angular to prevent the rocking movement.

Disc 16 is configured as a section of a solid sphere and, therefore, includes a pair of flat surfaces 34 and spherical periphery 36. One of the flat surfaces, as shown in FIGS. 1 and 2, is secured to element 10 in any suitable manner, such as by an epoxy resin 38. Spherical surface 36 is configured to fit exactly within spherical surfaces 30 of seat 20.

The motions enabled by these spherical interfits between disc 16 and seat 20 and the cylindrical interfit between seats 20 and channels 22a and 26 permit disc 16 many movements with respect to housing 18 and, therefore, support 12. These several movements are illustrated in FIGS. 5a-5c. As an aid to describing such movements, in addition to axis 19 of housing 18, disc 16 is described as having a center 40, an axis 42 and a plane 44 both passing through center 40. Axis 42 is perpendicular to sides 34 and to plane 44. Plane 44 is parallel to sides 34 and passes through and bisects spherical surface 36. Being positioned in a circle, seats 20 are also described as having a center which is coincident with center 40 of disc 16 and a plane 46 passing through its center and fixed normal with respect to housing axis 19. Thus, center 40 is referred to alternately as a disc center or a seat center.

Accordingly, as depicted in FIG. 5a, disc 16 and seats 20 may move linearly with respect to housing 18 on axis 19 as denoted by double-headed arrow line 48. This rectilinear motion exists as a result of the interfitting of seats 20 within their channels 22a and 26. As illustrated in FIG. 5b, disc 16 may rotate about center 40 out of plane 46 of seats 20, as denoted by double-headed arrow arc 50, so that axis 42 of the disc, which is shown as coincident in FIG. 5a with housing axis 19, is now annularly offset therefrom. Disc 16 may also rotate, as shown in FIG. 5c, in a direction perpendicular to that illustrated in FIG. 5b, as represented by double-headed arrow arc 52. Finally, the disc may rotate with respect to seats 20 in the direction of double-headed arrows 54, as shown in all of FIGS. 5a-5c. Accordingly, disc 16 has three degrees of rotational freedom with respect to housing 18 as a result of its spherical interfit with seats 20 and a linear degree of freedom with respect to the housing as a result of the interfit between seats 20 and the housing. This latter interfit, see FIG. 3, permits a small rocking motion. It is to be understood that the movements depicted in FIGS. 5a-5c are greatly exaggerated in order to illustrate clearly these rotational and linear movements.

Since discs 16 are secured to the periphery of element 10 as illustrated in FIGS. 1 and 2, any distortions which might otherwise be imparted to the element from support 12 are avoided by the individual abilities of discs 16 to move rotationally and linearly within their individual housings 18. Any preliminary adjustments between housing 18 and support 12 may be effected in a manner similar to that described in above-identified U.S. Pat. No. 4,268,123.

Further adjustment of discs 16 within housing 18 may be obtained by use of the mechanisms illustrated in FIGS. 6-9. In this embodiment, the spring-loaded arrangement within channel 22b of FIG. 3 may be replaced by an equivalent, but adjustable, spring mechanism within a channel 122b, partially shown in FIGS. 6 and 7, to form part of an adjustment mechanism. Here, the spring mechanism, which is depicted in FIG. 9, includes a pad block 124 having a cylindrically shaped recess 126 for receipt of seat 20, such as is shown in FIG. 4. Helical spring 128 is positioned within a bore within channel 122b and is placed about a plunger 130 which is secured to and extends from pad block 124. Tension on the spring is adjusted by a pressure adjusting screw 132 which threadedly engages housing 118. After the spring has been suitably compressed by adjusting screw 132, a set screw 134 which engages housing 118 through a threaded bore 136 (see also FIGS. 6 and 7) contacts screw 132 to lock it in place.

The second channel of housing 118 is the same as in housing 18 of FIG. 3 and, therefore, is denoted with the same indicium 22a. The other channel 22a of FIG. 3, however, is modified to receive another part of the adjustment mechanism and, therefore, is denoted as channel 122a.

As also shown in FIGS. 8a and 8b, within channel 122a is a seat block 138 having a cylindrical concave surface 140 for receipt of seat 20, also configured as shown in FIG. 4. Seat block 138, at its other surface, contacts a cam block 142. Both seat and cam blocks 138 and 142 are positoned within cavity 122a for linear sliding therein towards and away from disc 16. This linear sliding is effected by a cam 144 which is positioned off-axis on a cam shaft 146. The cam shaft is mounted for rotation within housing 118 and extends partly into channel 122a into contact with cam block 142.

Figure 6:
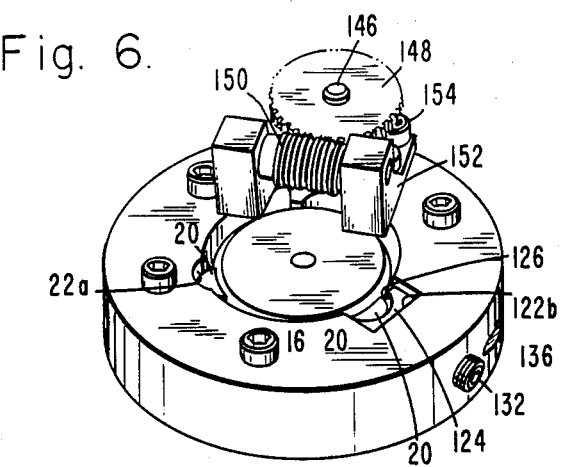
FIGS. 6 and 7 are perspective front and back views of a modification of the embodiment of FIG. 3 for adjusting the position of a disc.
Figure 7:
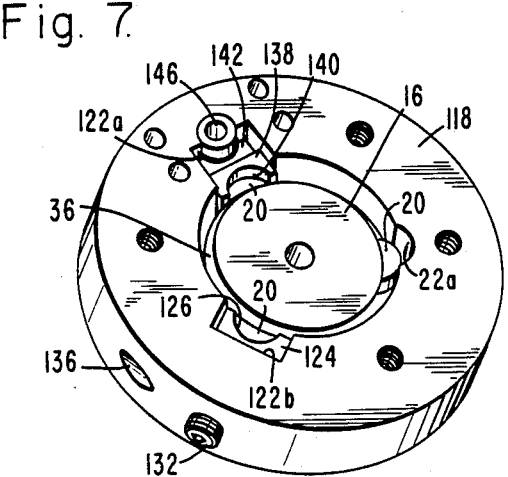

As shown in FIG. 6, a gear 148 is secured to one end of cam shaft 146 and meshes with a worm 150 which is mounted within a gear bracket 152. The gear bracket is bolted or otherwise secured to housing 118 by bolts 154. Rotation of worm 150 causes gear 148 and cam shaft 146 to rotate. Rotation of the cam shaft causes cam 144 also to rotate. Depending upon the disposition of the cam on cam block 142, the cam block is caused to move linearly towards or away from disc 16 through its contact with pad block 124 and seat 20. Movement of seat 20 by cam 144 towards disc 16 causes the disc and one seat 20 to pivot or rock within its channel 22a and to compress helical spring 128. Opposite movement of cam and pad blocks 142 and 138 is effected by the stored energy within helical spring 128. This adjustment by use of the mechanisms illustrated in FIGS. 6-9 is desired when the center of disc 16 is to be moved.

Thus, the center of element 10 can be adjustably moved within support 12 by cooperation of two assemblies of elements positioned between support 12 and two of seats 20. The first assembly (shown in FIGS. 6, 7 and 9) comprises pad block 124, cylindrically shaped seat 126, helical spring 128, plunger 130, pressure adjusting screw 132 and set screw 134. The second assembly (shown in FIGS. 6, 7, 8a and 8b) comprises seat block 138, cylindrical concave surface 140, cam block 142, cam 144, cam shaft 146, gear 148 and worm 150. The two assemblies enable a first of the two seats at block 138 to move towards and away from support 12 and a second of the two seats at block 124 to move in a direction away from and towards the support opposite from that of the movement of the first of the two seats, with the third seat in channel 22a acting as a pivot for the first and second seats.

Although the invention has been described with reference to particular embodiments thereof, it should be realized that various changes and modifications may be made therein without departing from the spirit and scope of the invention.

What is claimed is:

1. A coupling between a support and an element having a center and lying generally in a plane within the support for relieving any stresses between the element and the support and any distortions on the element, comprising:

first means having both a sliding engagement with the support for movement in the element plane towards and away from the element center, and a spherical surface centered within a plane which is normal to the element plane; and second means coupled to the element and provided with a spherical surface in engagement with said first means spherical surface, said spherical surfaces being so arranged that one of said surfaces resides within the other of said surfaces.

2. A coupling according to claim 1 in which said first means comprises three seats spaced 120° apart, each having a surface comprising a segment of a sphere to form collectively said spherical surface in surrounding engagement with said second means spherical surface.

3. A coupling between a support and an element having a center and lying generally in a plane within the support for relieving any stresses between the element and the support and any distortions on the element, comprising:

first means comprising three seats spaced 120° apart, each having a surface comprising a segment of a sphere to form collectively a spherical surface and having a sliding engagement with the support for movement in the element plane towards and away from the element center, said spherical surface being centered within a plane which is normal to the element plane; and second means coupled to the element and provided with a spherical surface in engagement with said first means spherical surface, said seats being in surrounding engagement with said second means spherical surface, the support including three concave surfaces configured as portions of circular cylinders and spaced 120° apart and each of said seats being shaped generally as a half of a solid right circular cylinder having a first surface along its diameter configured as said spherical segment and a second surface along its half circular periphery having a cylindrical configuration, with each of said second surfaces being respectively placed in each of said support concave surfaces to form said first means slidable engagement.

4. A coupling according to claim 3 further including means coupled respectively between said support and two of said seats for enabling movement of a first of said two seats towards and away from said support and movement of a second of said two seats in a direction away from and towards said support opposite from that of the movement of said first of said two seats, with the third of said seats acting as a pivot for said first and second seats, for adjusting the element center within the support.

5. A coupling according to claim 4 in which said support-to-seats coupling means comprises mechanisms between said support and each of said two seats for urging respective separation and closure movements therebetween.

6. A coupling according to claim 5 in which said mechanisms comprise resilient and cam elements between said support and respective ones of said two seats.

7. Apparatus including a mounting and aligning device comprising:

an element lying generally in a plane;
a support surrounding said element; and
a plurality of disc members and seats therefor positioned in the plane of and supporting said element and respectively coupled to said support, each said disc member having a center and a spherically curved outer surface and each said seat having a spherically curved surface conforming to and engageable with said disc member outer surface to provide three degrees of freedom of rotatable engagement therebetween and each of said seats having a cylindrical fit with said support for linear movement therein perpendicular to the plane of said element.

8. Apparatus according to claim 7 further comprising a spring engaging at least one of said seats to compensate for any machining tolerance between said outer surface respectively of said disc member and seats and said support.

9. An apparatus for maintaining an optical element in a substantially fixed orientation about an axis and substantially immune to environmentally-induced stresses and strains in members adjacent thereto, comprising, in combination:

a support provided with means therein defining a plurality of selectively spaced openings;

a plurality of retaining seat pads, each respectively mounted in the openings and movable linearly perpendicular to the optical element axis, each pad having a spherical inner surface;

a plurality of cylindrical disc members each having a spherical outer surface which is slidably mounted respectively within each of said pads for angular rotation about three major axes through each disc member, and having parallel opposing surfaces; and wherein said optical element is mounted within said support, and is affixed to each disc member at one of the parallel surfaces thereof, whereby angular and linear stresses and strains imparted between said optical element and said support are absorbed by said disc members and are translated into angular and linear motion of said disc members and said pads, thereby to enable the orientation of said optical element within said support to remain fixed.

10. The apparatus defined in claim 9 wherein said spaced opening means include separate and spaced upstanding housings secured to said support and incorporating the openings, said pads are each received by said housings within the openings, and at least one of said pads is spring loaded in its housing to minimize any machining tolerances of said spherical outer surfaces of said disc members and said pad surfaces with respect to said housings.

11. The apparatus defined in claim 10 wherein said housings, pads and disc members are arranged in three groupings and said groupings are mounted in said support 120° apart from one another, and said disc members each engage said optical element on an outer cylindrical surface thereof, and further including means for orienting said optical element in said support by movement of one or more of said disc members and said pads.

12. A device for peripherally mounting an element to a support with a minimum of strain and distortion exerted on the element, comprising:

mounting means positioned around the periphery of the element and including seating means coupled to the support for linear movement therein and disc members coupled to the element, said disc members each having a center lying in a common plane passing through the element and a spherically contoured outer surface centered about the center, and each said seating means having an inner spherical surface whose axis is coincident with the disc member center and which is in conforming intimate contact with said disc member surface to provide three-dimensional rotation of each of said disc members with respect to said seats.

13. The device of claim 12 further including a preloaded spring exerting a spring force against said seating means.

* * * * *

UNITED STATES PATENT AND TRADEMARK OFFICE
CERTIFICATE OF CORRECTION

PATENT NO. : 4,929,073

DATED : May 29, 1990

INVENTOR(S) : JOHN A. LA PLANTE and ROBERT D. SCHAEFER

It is certified that error appears in the above-identified patent and that said Letters Patent is hereby corrected as shown below:

Column 4, line 64, after "36" insert --which by definition, includes a circular peripheral portion--.

Signed and Sealed this

Twentieth Day of August, 1991

Attest:

HARRY F. MANBECK, JR.

Attesting Officer

Commissioner of Patents and Trademarks